Feb. 26, 1957 L. R. PISTOLES 2,783,460

GAGES

Filed Feb. 9, 1954 3 Sheets-Sheet 1

INVENTOR
LAMBERT R. PISTOLES

BY F. P. Keiper

ATTORNEY

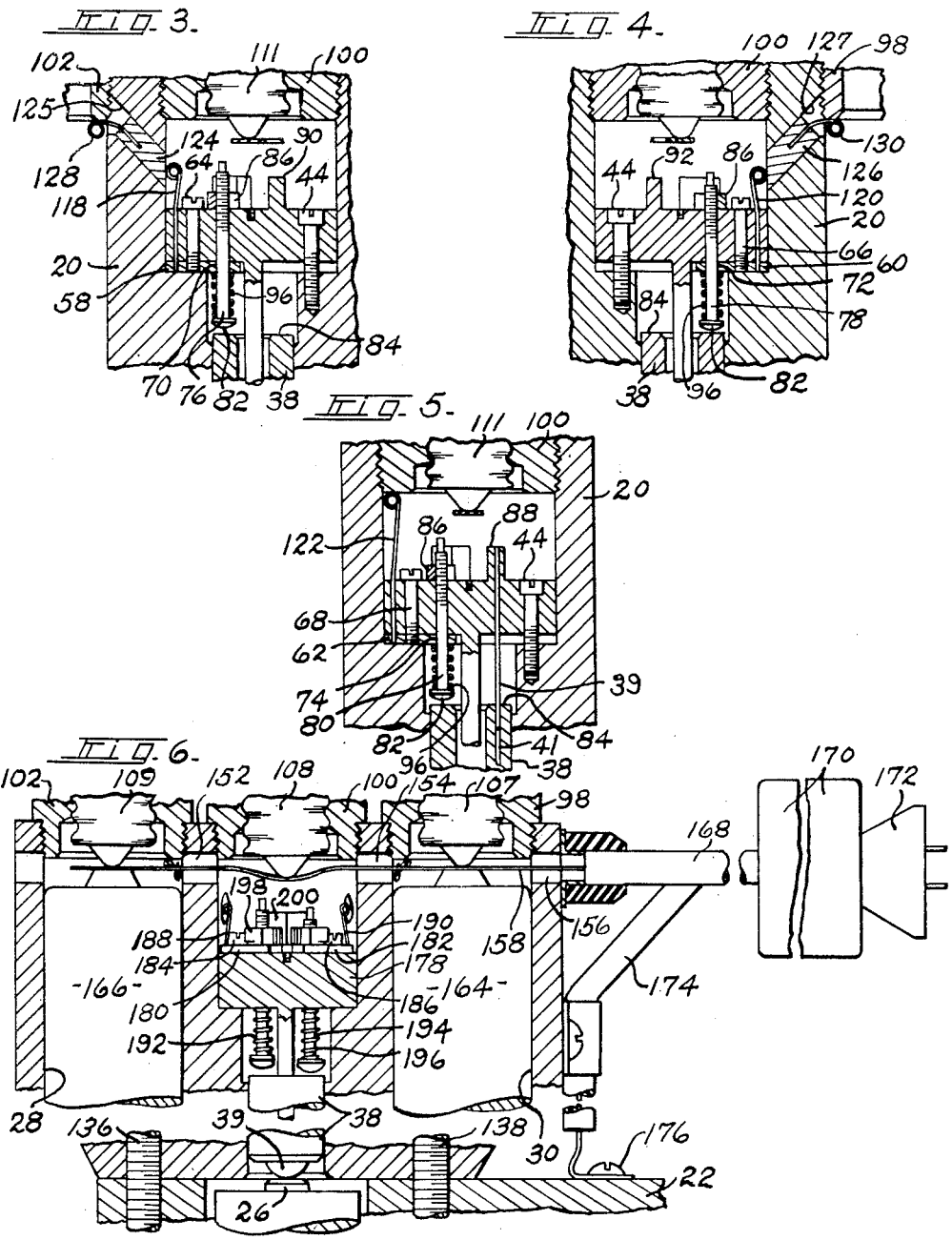

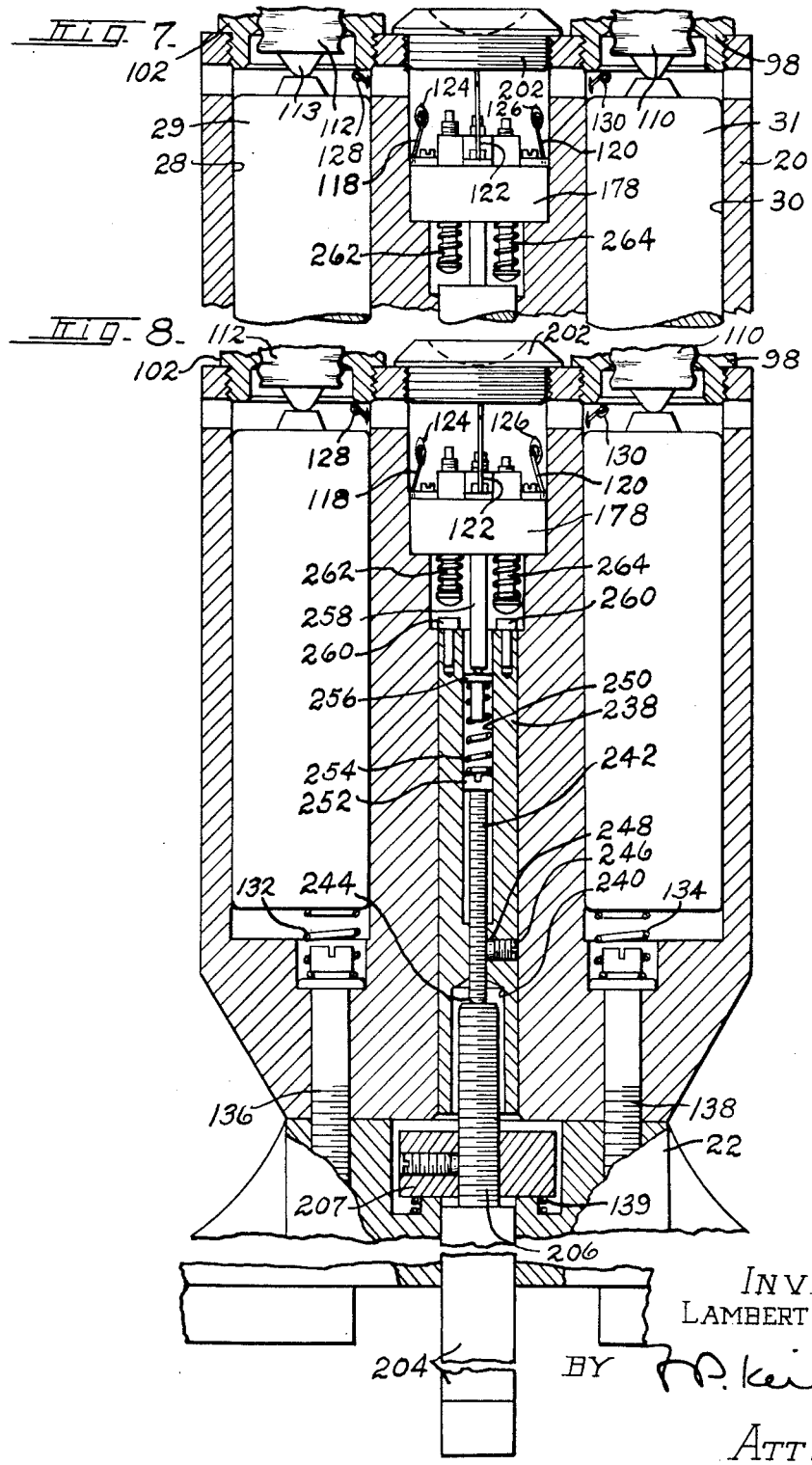

2,783,460
Patented Feb. 26, 1957

2,783,460
GAGES

Lambert R. Pistoles, Wilmington, Del.

Application February 9, 1954, Serial No. 409,121

9 Claims. (Cl. 340—265)

This invention relates to pin or snap type gages, and more particularly to an electrical indicator adapted for application to such gages.

In applications Serial No. 62,738, filed November 30, 1948, now Patent No. 2,678,502, and Serial No. 271,917, filed February 16, 1952, now Patent No. 2,677,125, respectively, there are disclosed a pin gage utilizing a dial indicator, and a similar pin gage in which an electrical indicator is employed, the electrical indicator being of compact design and capable of handling as readily as the dial type.

The present invention is directed to the improvements in the indicator portion of the gage shown in the latter application, and is more particularly directed to an apparatus in which adjustments are simplified, with a minimum disassembly of the indicator, and in which provision is made for indicating maximum and minimum dimensions, as well as the optimum dimension. The invention further has to do with the utilization of an all-metal construction wherein by Martin hard coating treatment, the surfaces of the requisite parts for insulation are rendered non-conductive, thereby eliminating separate insulating parts as such. Further, the invention provides for utilization of battery cells, or a plug-in alternative source of power.

The above and other novel features of the invention will appear more fully hereinafter from the following detailed description when taken in conjunction with the accompanying drawings. It is expressly understood that the drawings are employed for purposes of illustration only and are not designed as a definition of the limits of the invention, reference being had for this purpose to the appended claims.

In the drawings, wherein like reference characters indicate like parts:

Figure 3 is a sectional view taken on the broken line 3—3 of Figure 2;

Figure 4 is a sectional view taken on the broken line 4—4 of Figure 2;

Figure 5 is a sectional view taken on the line 5—5 of Figure 2;

Figure 6 is a fragmentary longitudinal sectional view of a somewhat modified apparatus additionally showing the application of an outside source of power;

Figure 7 is a fragmentary longitudinal sectional view showing the indicator adapted to operate with two indicators; and Figure 8 is a longitudinal fragmentary sectional view of the gage indicator adapted for association with a depth gage.

Figure 1:
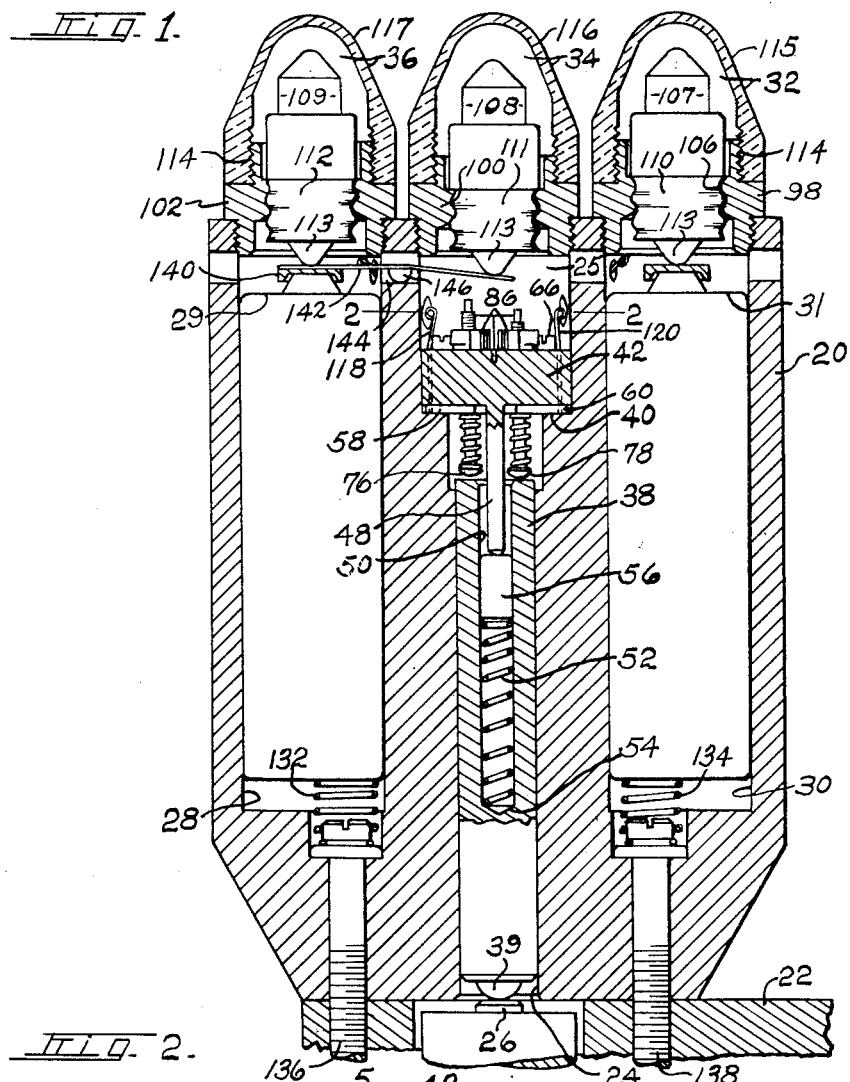
Figure 1 is an enlarged longitudinal section through one form of the electrical gage indicator.
Figure 2:
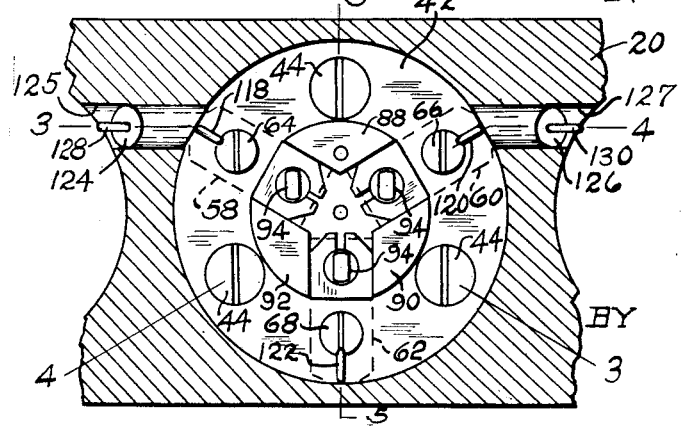
Figure 2 is an enlarged fragmentary sectional view taken on the line 2—2 of Figure 1.

In Figure 1, there is shown a body portion 20 about twice the actual size, composed of light aluminum alloy which is adapted to be secured to a gage head 22 similar to that shown in my copending applications Serial Nos. 62,738 and 271,917, filed November 30, 1948, and February 10, 1952, respectively. The body portion 20 is provided with a central bore 24 which is adapted to be aligned with the gage pin 26. The bore is stepped at the upper end to provide an enlarged cylindrical cavity 25. Laterally disposed on either side of the bore 24 are cylindrical cavities 28 and 30 of a size to receive miniature dry cells 29 and 31. At the upper end of the body portion and in alignment with the cylindrical cavities 28 and 30 and the enlarged portion 25 of the central bore 24 are three indicator lights 32, 34 and 36, light 32 in practice being preferably green, the middle light 34 being yellow, and the light 36 being red, although any color combination can be used. In practice, the green light, when energized, serves to indicate that in a gaging operation, the member being measured is of a dimension at least equal to or exceeding the minimum tolerance. The yellow light serves to indicate that the part being gaged is a dimension equal to or exceeding the optimum dimension, and the red light serves to indicate that the maximum tolerance has been reached or exceeded.

Within the bore 24, there is positioned a freely slidable plunger or master contact pin 38, which pin is provided with a spherical end 39 adapted to engage the end of the gage pin 26. Also in the bore and seated upon a shoulder 40 therein, is a transverse pin-supporting circular block member 42, such member being secured rigidly in position upon the shoulder 40. The block member 42 has mounted thereon adjustable contact pins such as 76 and 78, as seen in Figure 1, which are adapted to engage the upper end of the master pin 38. The master pin 38 is resiliently urged downwardly into endwise contact with the gaging pin 26 through an axial finger 48 formed integral with the block 42 that projects into a hollow bore 50 within the pin 38. Such hollow bore contains a compression spring 52 compressed between the lower end 54 of the bore and a sliding block 56, which block is adapted to bear against the finger 48 and urge the pin 38 downwardly through the compression of the spring 52.

The block 42 and the body portion 20, when completely machined and finished, are treated to provide a Martin hard coating of approximately .002″ thickness, which coating is aluminum oxide and produced by a form of the well-known anodic process for treating aluminum. Such coating has a high insulation value and provides the necessary insulation between the various parts as is necessary to prevent short circuits. Since it will be understood that the voltages employed are in the order of 1 to 2 volts, as is obtained from an ordinary single primary flashlight dry cell, which for lightness and long life may be of the mercury type, the thickness of the insulating layer or surface need not be great.

The block 42 on its under face is provided with three radial contact members in the form of flat plates 58, 60, and 62, secured against the bottom of the block 42 by screws 64, 66, and 68 extending through the block. Each of the plates, as is shown in Figures 3, 4, and 5, have apertures 70, 72, and 74, through which slidably extend the contact pins 76, 78, and the contact pin 80. Such contact pins are provided with a lower contact head 82, the surface of which is slightly spherical or convex and suitably silvered or otherwise provided with a non-tarnishing electrical contact surface adapted for making accurate and reliable electrical contact with the upper annular end face 84 of the master pin 38, the upper end face of which is likewise silvered or otherwise treated for good electrical contact. Each of the pins 76, 78, and 80 are threaded along their upper ends, and are provided with split lock nuts 86, having flat sides adapted to prevent rotation by engagement with the sector-shaped cheek members 88, 90, and 92, projecting up from and formed integral with the block 42. The block is secured in place by screws 44, extending into the shoulder 40.

The tip end of each of the contact pins 76, 78, and 80 are provided with flats 94 adapted to be engaged by a hollow complementary end of a socket wrench having an extended screw-driver type handle. Each of the pins 76, 78, and 80 are provided with a light compression coil spring such as 96 threaded on the lower end between the contact head 82 and the respective plate through which the particular pin extends, so that each of the pins is resiliently urged downwardly toward the sliding pin 38. Such coil springs serve as conductors between the pins 76, 78, and 80, and their respective plates 58, 60, and 62. It will be seen that by rotation of the various contact pins 76, 78, and 80 through application of the socket wrench referred to, any particular set of lengthwise adjustments can be effected. The pin 78, for example, will be set to contact the master pin 38 as it rises in the bore 24, when the minimum dimension is indicated, and the contact pin 80 will be set so as to be contacted after movement of the pin to the middle of the tolerance limit. The pin 76 will be set so as to contact the master pin 38 as the other limit of tolerance is reached. The contact pins are so adjusted to provide sequential contact upon a range of selected movement of the pin 38, so that as the pin 38 makes successive contacts, a true indication of the position of the pin will be discernable by mere observation of the indicator lights energized. The pin 38 is prevented from rotation in the bore 24 by a stiff guide wire 39, mounted in and projecting from the block 42 into a deep aperture 41 in the pin 38 (see Figure 5). Such wire has a press fit and is insulated from the block by the oxide treatment referred to.

Each of the indicator lights 32, 34, and 36 comprises the annular socket members 98, 100, and 102, respectively, which are screw-threaded in the upper ends of the cell cavities 28 and 30 and the enlarged bore or cavity 25 of the center master pin bore 24. Each of the socket members are internally threaded as at 106 to receive miniature incandescent lamps 107, 108, and 109, such lamps having threaded contact shells 110, 111, and 112, connecting the lamp to the respective socket members 98, 100, and 102, and central contacts 113 adapted to make connection to the positive poles of the battery cells or members associated or having connection therewith. Each of the sockets 98, 100, and 102 is provided with an externally threaded sleeve 114 over which is secured a transparent plastic bulb cap, as 115, 116, and 117. In the case of the lamp 32, the cap 115 is green, the center cap 116 is yellow, and the left hand cap 117 is red. The central socket member 100 differs slightly from the socket members 98 and 102, in that the incandescent lamp contained therein is allowed to seat slightly lower therein to enhance the contact of the incandescent lamp with a leaf contactor of which further reference will be made in connection with an adaptation eliminating the battery cells.

As has been previously described, the body portion 20 and the block member 42 are of aluminum alloy which through a form of anodic treatment is given an oxide coating throughout to produce a Martin hard coating of about .002" thickness. The coating, because of its oxide nature, provides a continuous insulating surface over both the body and the block. Thus, the plate members 58 and 60 and 62, and their mounting screws, although secured to the block 42, are insulated therefrom by such surface treatment, and the master pin 38 sliding in the bore 24 is insulated from the body portion 20 by the non-conductive bore surface and the finger 48 does not make electrical contact with the block 56.

In order to complete electrical circuits to the incandescent lamps, there extend through apertures in the block 42, resilient contact springs 118, 120 and 122. The contact springs 118 and 120 extend through the block 42 and are suitably soldered to the plates 58 and 60, but do not make electrical contact with the block by reason of the non-conductive surface treatment. Such contact springs extend above the block, and are adapted to connect with inclined conducting plugs 124 and 126 arranged in inclined bores 125 and 127, which plugs carry further contact springs 128 and 130 in their other ends adapted to engage the lower annular rim of the lamp sockets 98 and 102. The contact spring 122 projects upwardly substantially parallel to the axis of the bore 24, and is adapted to contact the annular rim of the socket 100 in the manner shown in Figure 5, when such socket is properly seated in place. The plugs 124 and 126 have a press fit in the bores 125 and 127, but do not make electrical contact with the body member 20 by reason of the hard oxide coating referred to.

The electrical cells are urged upwardly in their compartments by conductive coil springs 132 and 134 contacting the negative terminals of such cells. The coil springs are mounted on the heads of screws 136 and 138 which extend through the bottom portion of the body 20 into the gage head 22, to which they make electrical connection. The gage pin 26 is in electrical contact with the gage head 22 as by a coil spring 139 positioned in the manner shown in the modification of Figure 8.

Connections through the contact pins 76, 78, and 80 to the various lamps are effected through contact springs 118, 120, and 122, as set forth, the first two through the inclined conducting plugs and the contact springs 128 and 130, and the latter in the manner previously described. Return flow to the positive terminal of the cells in the case of the red lamp 36 is effected directly through the lower tip of the bulb and its contact through a contact pad or cap 140 in direct contact with the positive terminal of the cell 29. Such cap is provided with a flat leaf spring having a fulcrumed spring 142 adapted to project through an aperture 144 between the central cavity and the cell cavity 30, the end of the spring contacting the tip end of the central lamp of the indicator 34. The leaf spring is provided with a spherical rocker 146 fulcrumed in the aperture 144.

The cell 31 contained in the cavity 30 has its positive terminal connected to the lamp of the green signal 32. It will be seen that upon closure of the contact pin 78 with the master pin 38, an electrical circuit is established through the lamp of indicator 32 and the cell 31. Upon closure of the contact pin 80 with the master pin 38, a circuit is established through cell 29 and the lamp of the yellow indicator 34. Upon the further closure of pin contact 76 and master pin 38, a further circuit is completed through the lamp of indicator 36, the lamps of the indicators 34 and 36 in such circumstances being connected in parallel and supplied from one cell. Since the indicator 32 will be energized with considerably greater frequency than either of the other two, it will be seen that the circuit provides an equalization of load upon each of the cells 31 and 29, the cell 31 being utilized to energize the single indicator which is activated most frequently, whereas the cell 29 is adapted to energize the indicators 34 and 36, whose combined demand upon the cell would about equal that of the indicator 32 upon its cell.

In Figure 6, there is shown a modified form of pin contact block wherein a flashing indication is provided for, the respective indicator lights giving a short flash as the pin 38 moves through the respective limits chosen for gaging. The indication, however, may be continuous if the dimension being gaged corresponds exactly with the particular limit for which the gage is set. There is also shown in Figure 6 an arrangement whereby power may be derived from a plug-in source, thereby eliminating electric cells which tend to deteriorate in time. In the arrangement shown, there is projected through the apertures 152 and 154 and the side aperture 156, a flat resilient ribbon connector 158 which is adapted to be squeezed between the center contact of the lamps 107 and 109 and dummy non-conductive cells 164 and 166. The center lamp 108, by reason of the socket permitting its insertion to a slightly greater depth as previously explained, makes contact with such leaf in the manner shown in Figure 6. The contact leaf 158 is connected to a low voltage cable 168 which leads to a small wattage step-down transformer 170, which for practical purposes may be combined with the cord and usual plug connector 172. The other terminal of the step-down transformer 170 is connected to the gage head 22 by the insulated conductor 174, the end terminal of which is securely connected to the gage head as by a screw 176.

In this modification, the contact pin carrying block 178 is provided on its top face with three radially disposed contact plates, two of which, 180 and 182, are shown in Figure 6. Such plates are secured to the block 178 by screws 184 and 186, and are provided with contact springs 188 and 190 making contact with the inclined plug connectors 124 and 126 previously referred to. The third contact plate (not shown) makes similar connection to the rim of the central lamp socket 100 in a manner similar to that previously described. The contact pins 192 and 194 slide freely through the plug 178 and are urged downwardly by coil springs 196. The upper end of such contact pins are threaded and fitted with split nuts 198, rotation of which is prevented by sector-like cheek members 200 as previously described in the modification of Figure 11.

The apertures in the plates 180 and 182 through which the pins 192 and 194 extend, and the plate for the other pin (not shown), are provided with sufficient clearance so as not to contact the pins such as 192 and 194. Contact to the plates 180 and 182 is had only through the under face of the split nuts 198 of the respective contact pins. Thus, when a contact pin makes contact with the master pin 38, an electrical circuit is momentarily completed from the pin 38 through the respective contact pin, through the split nut to the respective plate. When the pin 38 is moved beyond the initial instant contact position between the contact pin and master pin, the contact pin is moved upward and thereafter the contact between the split nut and its respective plate is broken. Through the arrangement thus described, it will be seen that a flash signal is effected in the signal lamp 107 as the gage pin passes through the minimum tolerance limit, that a second flashing signal is effected in the lamp 108 as the gaging pin moves through the optimum dimension between the minimum and maximum tolerance limits, and that the lamp 109 is caused to flash as the gage pin passes through the maximum tolerance limit.

In the modification shown in Figure 7, the optimum dimension yellow signal lamp has been removed, it being desirable at times to operate with but two signal indications, that is, minimum and maximum tolerance dimension signals. It will be seen that to operate either of the modifications previously described in such manner with but two indicator lamps, the central indicator socket may be removed and a plug 202 substituted. Such plug may contact the contact spring 122, but since the plug will make no electrical contact to the body 20 by reason of the non-conducting surface treatment of the body 20, and the threads into which the plug is screwed, the apparatus will operate in the manner previously described.

In such an arrangement, it is desirable that each lamp be operated by its respective cell independently of the other lamp and its cell, and the interconnecting member 142 previously referred to can be dispensed with.

In the modification shown in Figure 8, provision is made for compensating the effective length of the master pin 38, whereby to accommodate a depth gage application. In depth gaging, to accommodate a wide range of depths, a series of gaging pins such as 204 are provided, of lengths varying by uniform amounts as half inch, and the shank 206 of the pin is of a length that it may be adjusted within the collar 207 to permit the pin to be set for any depth to be measured, within the half inch range of the pin selected. The upper end of the pin 208 thus varies in height above the collar 207 through a range of a half inch, in accordance with the dimension for which the gage is set.

In order to accommodate the wide range of adjustment thus required, the pin 238 is provided with a hollow bore at its lower end as at 240, into which the upper end of the gage pin 206 projects. At the same time, the pin 238 is provided with an abutment screw 242 which may be adjusted axially with respect to the pin 238, such adjustment screw having a lower hardened end 244 adapted to accurately contact the end of the gage pin 204. Such screw, when set, may be held by a set screw 246 having a brass screw-engaging end 248, whereby to minimize danger of damage to the abutment screw 242. The upper end of the bore 250 in which the head 252 of the abutment screw lies, is provided with a coil compression spring 254 which engages a sliding plug member 256 which, in turn, is adapted to engage the depending finger 258 of the contact-carrying block member 178. In the form shown in Figure 8, the upper end of the master pin 238 may be provided with contact pins 260 which may be especially adapted to mate with the contact ends of the contact pins 262 and 264 carried by the block 178.

It will be appreciated that when it is desired to adjust the indicator, all that is required is that the central socket of the indicator lamp 34 of the plug 202 be removed, whereupon the polygonal ends of the contact pins are exposed and may be turned through application of the socket wrench previously referred to. The split nuts frictionally hold any adjustment effected, and once the gage is set, the cavity is either closed by the indicator 34 or the plug 202. If it is desired to change the effective length of the master pin as in Figure 8, the block 178 can be removed, the screw 252 turned, while the pin is held by a split blade wrench engaging the sides of contacts 260. Such adjustment is of a rough nature, the adjustment of the contact pins in the split nuts being the fine adjustment.

As may be seen in Figure 8, the collar 207, with the clearances, permits the pin 204 to move through a range exceeding that between any minimum and maximum tolerance that might be selected. The range of movement is so limited, however, as to be well within the range of movement of the contact pins 262 and 264, so that the contact pin cluster is protected from damage by the absolute limits imposed on the collar 207. The spring 139 is also of lighter tension than the spring 254, or 52, so that the gage pin 26 or 204 is always in the position shown in Figure 8, except when the lower tip end is actually in contact with a work piece undergoing a gaging operation.

While one of the modifications provides for continuous indication, and the other for flash indication, it will be observed that where the three indication system is employed, it might be desirable to use a combination of continuous and flash, a flash indication being used for indicating the optimum or median dimension within the tolerance limits. In such case, the yellow indicator circuit of Figure 1 would be provided with a contact pin and plate like that of Figure 6, while the red and green remain as shown in Figure 1.

While several embodiments of the invention has been illustrated and described, it is to be understood that the invention is not limited thereto. As various changes in the construction and arrangement may be made without departing from the spirit of the invention, as will be apparent to those skilled in the art, reference will be had to the appended claims for a definition of the limits of the invention.

What is claimed is:

1. An electrical gage indicator comprising a housing having a bore therein adapted to be mounted in alignment with a gaging pin, a master pin slidable in the lower portion of said bore and adapted to engage a gaging pin, a contact pin supporting block in said bore having a plurality of yieldingly mounted contact pins adapted to be sequentially engaged by said master pin, said housing having elongated cylindrical cavities for receiving electric cells in opposite sides of said bore, said cavities extending substantially parallel with said bore and lying in a common plane with said bore, said enlarged bore and said cavities being open-ended along the top surface of said housing, and a series of three electrical indicator lamps mounted in the ends of said cavities and bore.

2. An electrical gage indicator comprising a one-piece housing block having a bore therein adapted to be mounted in alignment with a gaging pin, said bore having an enlarged diameter portion at the upper end thereof, a master pin slidable in the lower portion of said bore and adapted to engage a gaging pin, a contact pin supporting block in the enlarged portion of said bore having a plurality of yieldingly mounted contact pins adapted to be sequentially engaged by said master pin, said housing having elongated cylindrical cavities for receiving electric cells in opposite sides of said bore, said cavities extending substantially parallel with said bore and lying in a common plane with said bore, said enlarged bore and said cavities being open-ended along the top surface of said housing and being of like diameter, and a series of three electrical indicator lamps mounted in the ends of said cavities and bore.

3. An electrical gage indicator comprising a housing in the form of an aluminum alloy block, having a bore therein adapted to be mounted in alignment with a gaging pin, said bore having an enlarged diameter portion at the upper end thereof, and a transverse annular shoulder between the upper and lower portions, a conductive master pin slidable in the lower portion of said bore and adapted to engage a gaging pin, a contact pin supporting block in said bore seated on said shoulder having a plurality of yieldingly mounted contact pins adapted to be sequentially engaged by said master pin, said housing having elongated cavities adapted to receive electric cells located on opposite sides from said bore and in parallel relation thereto, a signal lamp mounted on said block for each of said contact pins and in alignment with each of said cavities and said bore, and circuit means connecting two of said contact pins and the signal lamps aligned with said cavities, including a conductive plug inserted in apertures connecting the enlarged bore portion with each of said cavities, said housing block having all surfaces thereof including the surfaces of said apertures rendered non-conductive.

4. In an electrical gage indicator, a body portion of aluminum alloy having a stepped bore therein providing an enlarged diameter portion and a lesser diameter portion and an intervening transverse shoulder, said body portion having a laterally disposed lamp socket receiving bore extending in parallel relation to said stepped bore, there being an intervening wall between said bores, and said wall having an inclined aperture connecting said bores, said body portion having all surfaces thereof rendered non-conductive, a cluster contact block seated on said shoulder, a conductive plug positioned in said inclined bore having an end surface flush with said enlarged diameter portion of said bore, and a resilient contact member carried by said block and bearing on said flush end surface.

5. In an electrical gage indicator, a body portion of aluminum alloy having a stepped bore therein providing an enlarged diameter portion and a lesser diameter portion and an intervening transverse shoulder, said body portion having a laterally disposed lamp socket receiving bore extending in parallel relation to said stepped bore, there being an intervening wall between said bores, and said wall having an inclined aperture connecting said bores, said body portion having all surfaces thereof rendered non-conductive, a cluster contact block seated on said shoulder, a conductive plug positioned in said inclined bore having an end surface flush with said enlarged diameter portion of said bore, a resilient contact member carried by said block and bearing on said flush end surface, a conductive lamp socket mounted in said laterally disposed bore, and a resilient contact member mounted in the other end of said plug and adapted to bear upon said socket.

6. An electrical gage indicator comprising a housing having a bore therein adapted to be mounted in alignment with a gaging pin, a master pin slidable in the lower portion of said bore and adapted at its lower end to engage a gaging pin and having an electrical contact surface at its upper end, a contact pin supporting block in the upper portion of said bore having a plurality of yieldingly mounted contact pins extending toward said pin contact surface, and each terminating in an electrical contact surface, said contact surfaces of said pins being adapted to be sequentially engaged by direct contact with the contact surface of said master pin.

7. An electrical gage indicator comprising a housing having a bore therein adapted to be mounted in alignment with a gaging pin, said bore having an enlarged diameter portion at the upper end thereof, a master pin slidable in the lower portion of said bore and adapted at its lower end to engage a gaging pin and having an electrical contact surface at its upper end, a contact pin supporting block in the upper enlarged portion of said bore having a plurality of yieldingly mounted contact pins extending toward said pin contact surface, and each terminating in an electrical contact surface, said contact surfaces of said pins being adapted to be sequentially engaged by direct contact with the contact surface of said master pin.

8. An electrical gage indicator comprising a housing having a bore therein adapted to be mounted in alignment with a gaging pin, a master pin slidable in the lower portion of said bore and adapted at its lower end to engage a gaging pin and having an electrical contact surface at its upper end, a contact pin supporting block in the upper portion of said bore having a plurality of yieldingly mounted contact pins extending toward said pin contact surface, and each terminating in an electrical contact surface, said contact surfaces of said pins being adapted to be sequentially engaged by direct contact with the contact surface of said master pin, means acting between said contact block and said master pin for yieldingly biasing said master pin to move away from said block, and electric indicating means in circuit with said master pin and each of said contact means.

9. An electrical gage indicator comprising a housing having a bore therein adapted to be mounted in alignment with a gaging pin, a master pin slidable in the lower portion of said bore and adapted at its lower end to engage a gaging pin and having an electrical contact surface at its upper end, a contact pin supporting block in the upper portion of said bore having a plurality of yieldingly mounted contact pins extending toward said pin contact surface, and each terminating in an electrical contact surface, said pin contact surface being adapted to be sequentially engaged by direct contact with the contact surface of said master pin, a signal lamp mounted on said block for each of said contact pins, and circuit means for each of said lamps including a source of electrical potential and said master pin, and a contact pin for each respective signal lamp.

References Cited in the file of this patent

UNITED STATES PATENTS

| | | |
|---|---|---|
| 2,433,585 | Warner | Dec. 30, 1947 |
| 2,595,063 | Engel | Apr. 29, 1952 |
| 2,617,866 | Ballantine | Nov. 11, 1952 |

FOREIGN PATENTS

| | | |
|---|---|---|
| 892,873 | France | Jan. 17, 1944 |
| 122,265 | Australia | Sept. 26, 1946 |